(12) United States Patent
Mukou

(10) Patent No.: US 11,577,405 B2
(45) Date of Patent: Feb. 14, 2023

(54) ROBOT HAND AND ROBOT SYSTEM

(71) Applicant: Fanuc Corporation, Yamanashi (JP)

(72) Inventor: Hiroshi Mukou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 697 days.

(21) Appl. No.: 16/585,527

(22) Filed: Sep. 27, 2019

(65) Prior Publication Data
US 2020/0122342 A1 Apr. 23, 2020

(30) Foreign Application Priority Data

Oct. 22, 2018 (JP) .............................. JP2018-198444

(51) Int. Cl.
*B65G 47/90* (2006.01)
*B25J 15/00* (2006.01)
*H02G 3/04* (2006.01)
*B25J 15/02* (2006.01)
(Continued)

(52) U.S. Cl.
CPC ....... *B25J 15/0052* (2013.01); *B25J 15/0038* (2013.01); *B25J 15/0253* (2013.01); *B25J 19/023* (2013.01); *B65G 47/90* (2013.01); *H02G 3/0456* (2013.01); *B25J 9/1697* (2013.01)

(58) Field of Classification Search
CPC .. B25J 9/1697; B25J 15/0038; B25J 15/0052; B25J 15/0253; B25J 19/023; B65G 47/90; H02G 3/0456
See application file for complete search history.

(56) References Cited

U.S. PATENT DOCUMENTS

| | | |
|---|---|---|
| 2004/0266276 A1 | 12/2004 | Hariki et al. |
| 2014/0012416 A1* | 1/2014 | Negishi ................. B25J 9/1607 |
| | | 700/251 |
| 2014/0277732 A1 | 9/2014 | Shiota et al. |

(Continued)

FOREIGN PATENT DOCUMENTS

| | | |
|---|---|---|
| DE | 102017217601 A1 | 4/2019 |
| EP | 1488893 A2 | 12/2004 |

(Continued)

OTHER PUBLICATIONS

Tanigawa, Keisuke; Notice of Reasons for Refusal; Japanese Patent Application No. 2018-198444; dated Nov. 17, 2020; 5 pages.

(Continued)

*Primary Examiner* — Saul Rodriguez
*Assistant Examiner* — Brendan P Tighe
(74) *Attorney, Agent, or Firm* — Shakelford, Bowen, McKinley & Norton, LLP

(57) ABSTRACT

The robot hand holds a wire harness having a long harness main body and a connector connected to an end of the harness main body. The robot hand includes a fixed holding portion which holds the harness main body a vicinity of the end thereof, a pressing portion movable relative to the fixed holding portion in a longitudinal direction of the harness main body held by the fixed holding portion, and a driving unit which moves the pressing portion in a direction away from the fixed holding portion such that the pressing portion presses the connector outwardly in the longitudinal direction of the harness main body.

12 Claims, 8 Drawing Sheets

(51) Int. Cl.
*B25J 19/02* (2006.01)
*B25J 9/16* (2006.01)

(56) References Cited

U.S. PATENT DOCUMENTS

2016/0297075 A1 10/2016 Lee et al.
2019/0160673 A1 5/2019 Hirata et al.

FOREIGN PATENT DOCUMENTS

| EP | 2783802 A2 | 10/2014 |
| EP | 3476547 A1 | 5/2019 |
| JP | H06-188061 A | 7/1994 |
| JP | 2000-228267 A | 8/2000 |
| JP | 2005-011580 A | 1/2005 |
| JP | 2005-142031 A | 6/2005 |
| JP | 2006-012724 A | 1/2006 |
| JP | 2010-069587 A | 4/2010 |
| JP | 2012-200805 A | 10/2012 |
| JP | 2014-176917 A | 9/2014 |
| JP | 2015-030086 A | 2/2015 |
| JP | 2017-226062 A | 12/2017 |
| WO | WO-2012127845 A1 | 9/2012 |

OTHER PUBLICATIONS

Industrial Property Cooperation Center; Search Report by Registered Search Organization; Japaneses Patent Application No. 2018-198444; dated Nov. 6, 2020; 9 pages.
Tanigawa, Keisuke; Notice of Reasons for Refusal; Japanese Patent Application No. 2018-198444; dated Feb. 2, 2021; 5 pages.

\* cited by examiner

ROBOT HAND AND ROBOT SYSTEM

CROSS-REFERENCE TO RELATED APPLICATIONS

This application is based on and claims priority to Japanese Patent Application No. 2018-198444 filed on Oct. 22, 2018, the content of which is incorporated herein by reference in its entirety.

TECHNICAL FIELD

The present invention relates to a robot hand and a robot system, and in particular to a robot hand for a wire harness having a connector on its end.

BACKGROUND ART

An assembly process of various devices includes a connecting operation in which a wire harness is transferred and a connector of the wire harness is connected to a counterpart connector. In recent years, the connecting operation has become increasingly automated (cf., PTLs 1-3). According to PTLs 1-3, the connector is connected to the counterpart connector by having the connector be held by a robot hand and moving the robot hand.

CITATION LIST

Patent Literature

{PTL 1}
Japanese Unexamined Patent Application, Publication No. H06-188061
{PTL 2}
Japanese Unexamined Patent Application, Publication No. 2014-176917
{PTL 3}
Japanese Unexamined Patent Application, Publication No. 2005-011580

SUMMARY OF INVENTION

A first aspect of the present disclosure provides a robot hand that holds a wire harness, wherein the wire harness has a long harness main body and a connector connected to an end of the harness main body, the robot hand including: a fixed holding portion which holds the harness main body at a vicinity of the end thereof; a pressing portion movable relative to the fixed holding portion, in a longitudinal direction of the harness main body held by the fixed holding portion; and a driving unit which moves the pressing portion in a direction away from the fixed holding portion such that the pressing portion presses the connector outwardly in the longitudinal direction of the harness main body.

A second aspect of the present disclosure provides a robot hand that holds a wire harness, wherein the wire harness has a long harness main body and two connectors respectively connected to one end and the other end of the harness main body, the robot hand including: a first holding portion which holds the harness main body at a vicinity of the one end; and a second holding portion which holds the harness main body at a vicinity of the other end.

A third aspect of the present disclosure provides a robot system including: a robot; the robot hand according to the first aspect, the robot hand being connected to a distal end of a robot arm of the robot; and a robot controller configured to control the robot and the robot hand to cause the robot and the robot hand to carry out a connector connecting operation for connecting the connector to a counterpart connector, wherein the connector connecting operation includes: holding the harness main body at a vicinity of an end using the fixed holding portion; pressing the connector using the pressing portion by an operation of the driving unit; and connecting the connector that is being pressed to the counterpart connector by an operation of the robot arm.

A fourth aspect of the present disclosure provides a robot system including: a robot; the robot hand according to the second aspect, the robot hand being connected to a distal end of a robot arm of the robot; and a robot controller which controls the robot and the robot hand to cause the robot and the robot hand to carry out a transfer operation for transferring the wire harness, wherein the transfer operation includes: holding the harness main body at a vicinity of the one end thereof using the first holding portion; holding the harness main body at a vicinity of the other end thereof using the second holding portion; and transferring the wire harness held by the first holding portion and the second holding portion by an operation of the robot arm.

DESCRIPTION OF EMBODIMENT

Hereinafter, a robot hand 1 and a robot system 100 according to one embodiment of the present invention will be described with reference to the drawings.

Figure 1:
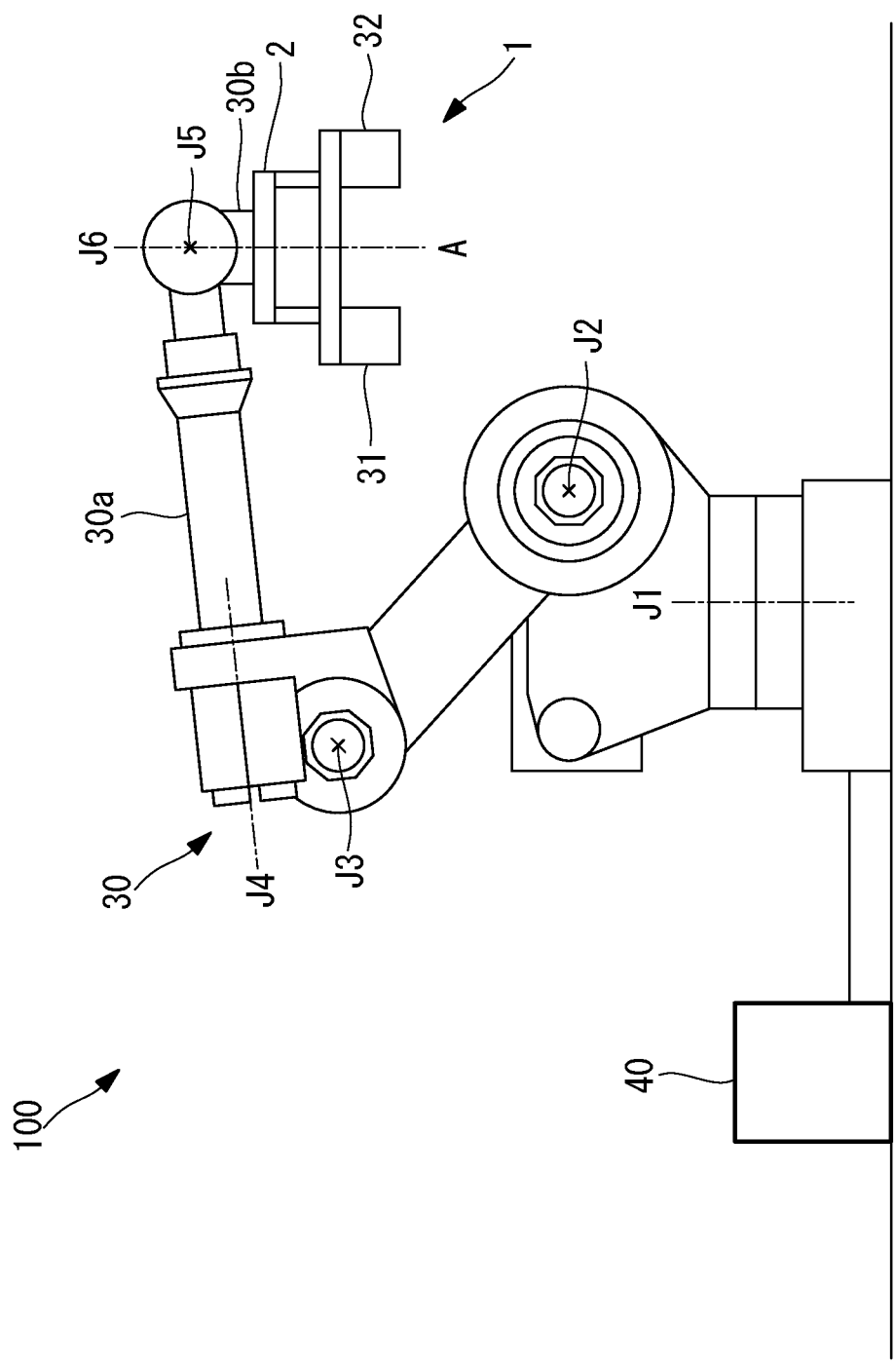
FIG. 1 is a schematic view illustrating an entire configuration of a robot system according to one embodiment of the present invention.
Figure 2:
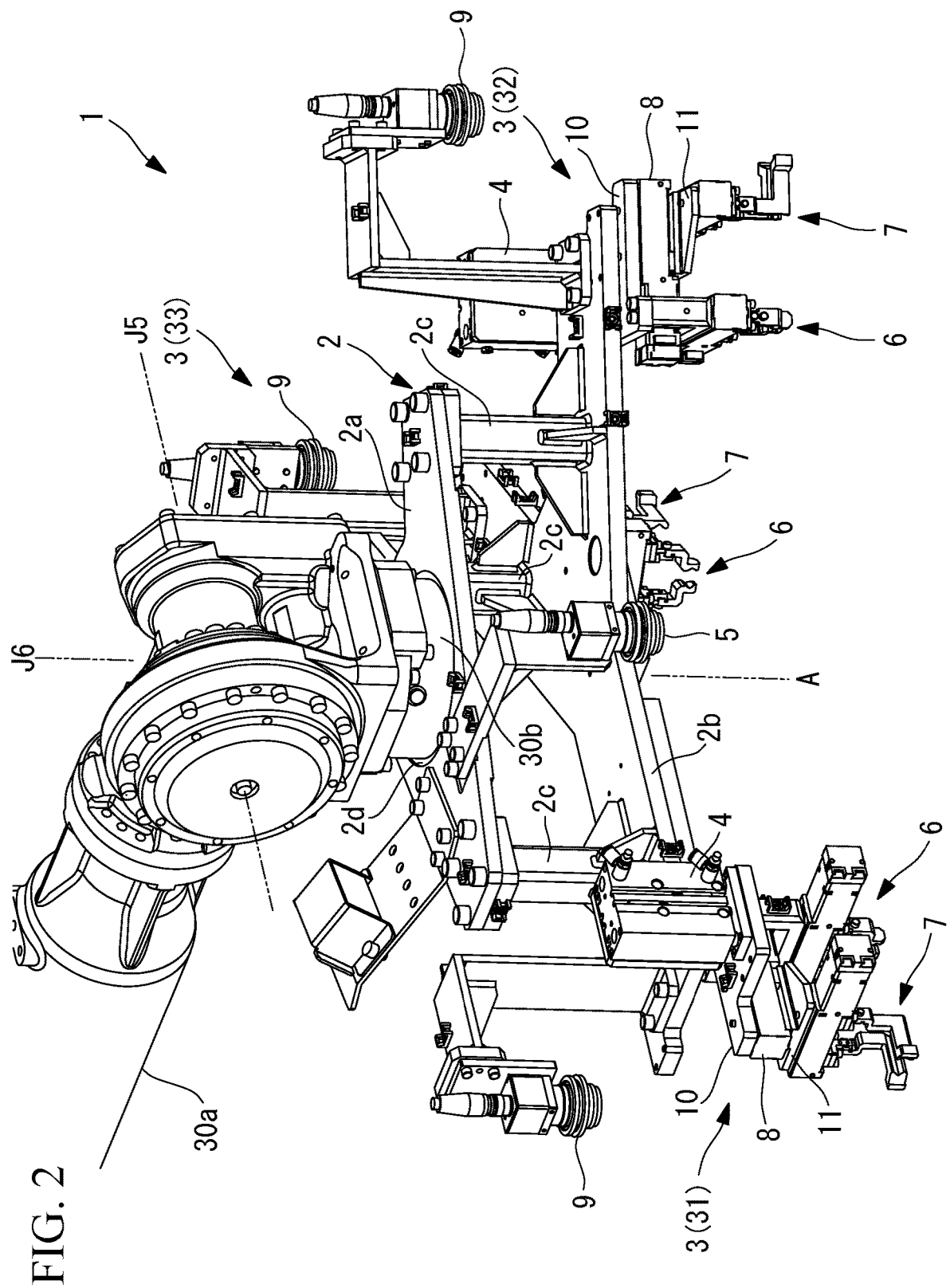
FIG. 2 is a perspective view illustrating an entire configuration of a robot hand according to one embodiment of the present invention, viewed from above.
Figure 3:
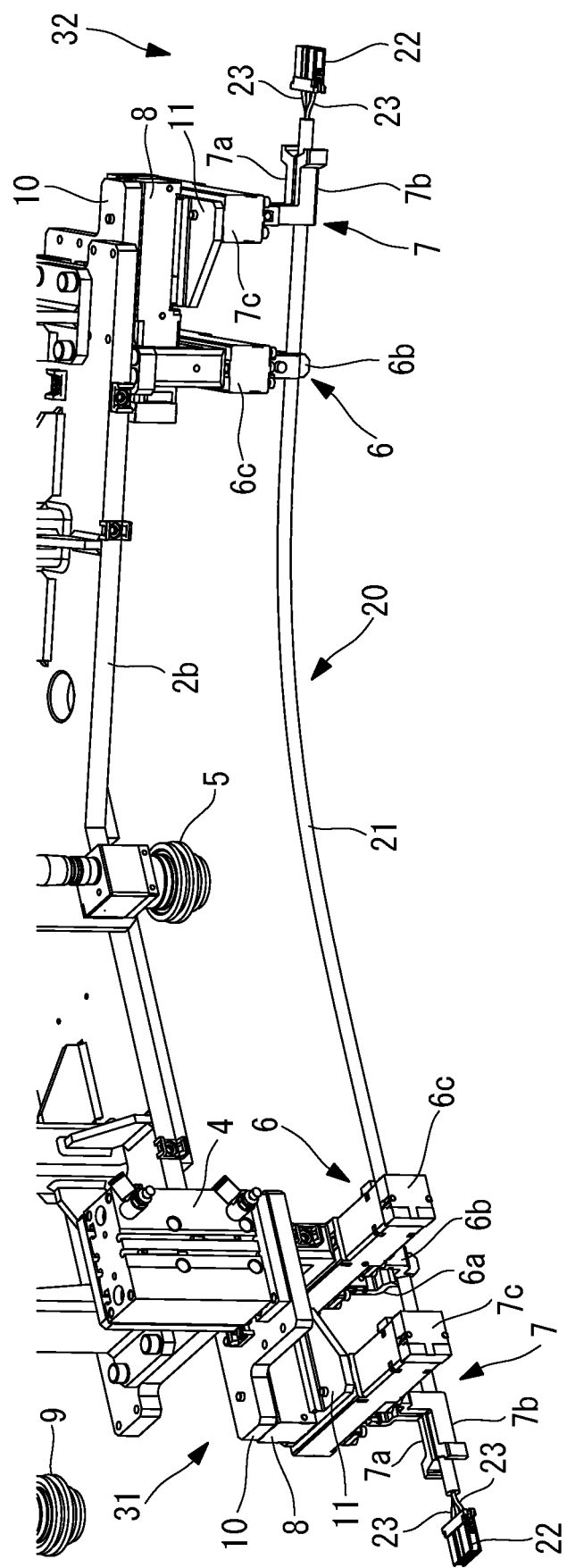
FIG. 3 is a partial perspective view of the robot hand shown in FIG. 2, in a state in which the robot hand holds a wire harness.

As shown in FIG. 1 and FIG. 2, the robot system 100 includes the robot hand 1, a robot 30, and a robot controller 40 that controls the robot 30 and the robot hand 1. As shown in FIG. 3, the robot system 100 holds a wire harness 20, and transfers the wire harness 20 and connects a connector 22 to a counterpart connector.

The wire harness 20 includes a flexible and long harness main body 21, and two connectors 22 respectively disposed on both ends of the harness main body 21. The harness main body 21 contains therein a plurality of wires 23. The plurality of wires 23 pass through the harness main body 21 in a longitudinal direction, and both ends of each of the plurality of wires 23 are connected to the connectors 22, respectively. In a radial direction of the harness main body 21, the connectors 22 have an outer diameter which is larger than that of the harness main body 21, and project radially outward from the harness main body 21.

The robot 30 includes a robot arm 30a having a plurality of joints, and a flange 30b to which the robot hand 1 is connected is disposed at a distal end of the robot arm 30a. FIG. 1 shows, as the robot 30, a vertical articulated robot having joint axes J1-J6. The robot 30 may be a robot of a different type that is commonly used for transfer of objects or assembly of devices. The robot 30 is connected to the robot controller 40, and a control command is supplied to each of servomotors of the joints of the robot arm 30a from the robot controller 40. The robot hand 1 is connected to the robot controller 40, and a control command or a driving force (e.g., electrical power or air pressure) is supplied to each of parts 4, 5, 6c, 7c, 8, and 9 of the robot hand 1 from the robot controller 40.

As shown in FIG. 2, the robot hand 1 includes: a base section 2 fixed to the flange 30b; three holding units 3 (31 and 32, 33) supported by the base section 2; three linear driving devices 4 that linearly move the three holding units 3, respectively, in a direction along a central axis A of the robot hand 1; and a camera (entire-body detection unit) 5 that is fixed to the base section 2 and detects a position and posture of the wire harness 20 as a whole. FIG. 3 shows the robot hand 1 holding the wire harness 20.

The base section 2 includes: two flat plates 2a and 2b that face each other in the direction along the central axis A; and a plurality of supporting posts 2c that extend between the plates 2a and 2b and fixe the plates 2a and 2b each other. The upper plate 2a is provided with an attachment portion 2d that can be attached to and removed from the flange 30b. In a state in which the attachment portion 2d is attached to the flange 30b, the central axis A of the robot hand 1 matches a central axis of the flange 30b (a sixth axis J6, in case of a 6-axis vertical articulated robot), and the plates 2a and 2b are disposed vertically relative to the central axis of the flange 30b. The lower plate 2b is in a Y shape having three ends. In a radial direction that is orthogonal to the central axis A, one of the ends of the lower plate 2b (first end) is disposed on one side (left side in FIG. 2), and two of the ends of the lower plate 2b (second end and third end) are disposed on the other side (right side in FIG. 2).

Hereinafter, the direction along the central axis A is defined as a vertical direction of the robot hand 1. Further, a side of the upper plate 2a is defined as an upper side, and a side of the lower plate 2b is defined as a lower side.

Figure 4:
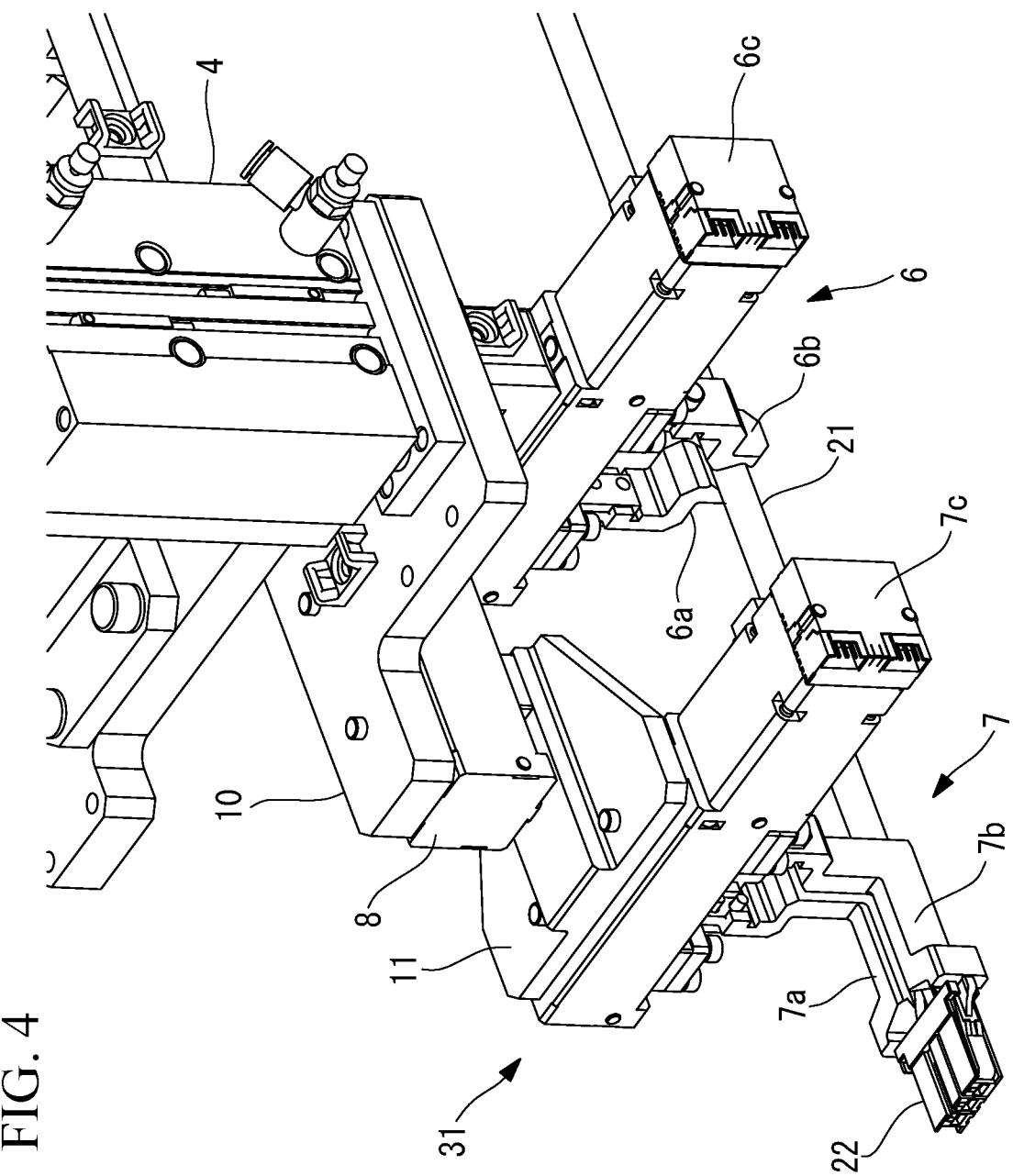
FIG. 4 is an enlarged perspective view of a fixed chuck unit and a movable chuck unit viewed from above, illustrating a state in which a connector is pressed by the movable chuck unit.

The three holding units 3 (31 and 32, 33) are respectively fixed to the three ends of the lower plate 2b. As shown in FIG. 2 through FIG. 4, each of the holding units 3 includes: a pair of chuck portions 6 and 7 that hold the harness main body 21 in a radial direction; a linear driving device (driving unit) 8 that linearly moves the chuck portion 7; and a camera (partial detection unit) 9 that detects an end of the wire harness 20 including the connectors 22. The chuck portions 6 and 7 and the linear driving device 8 are connected to the linear driving devices 4 via a fix plate 10.

The pair of chuck portions 6 and 7 are arranged on a plane orthogonal to the central axis A. The one chuck portion 6 is a fixed chuck unit (fixed holding portion) that is fixed to the fix plate 10 and that is able to move relative to the base section 2 only in the direction along the central axis A. The other chuck portion 7 is a movable chuck unit (pressing portion or movable holding portion) that is able to move relative to the fix plate 10 and the fixed chuck unit 6 along a direction in which the pair of chuck portions 6 and 7 are arranged. The movable chuck unit 7 is disposed at a position outside of the fixed chuck unit 6 in a radial direction (position more distant from the central axis A). With this, the movable chuck unit 7 is positioned between the fixed chuck unit 6 and the connectors 22 in a state in which the fixed chuck unit 6 holds the harness main body 21.

Figure 5:
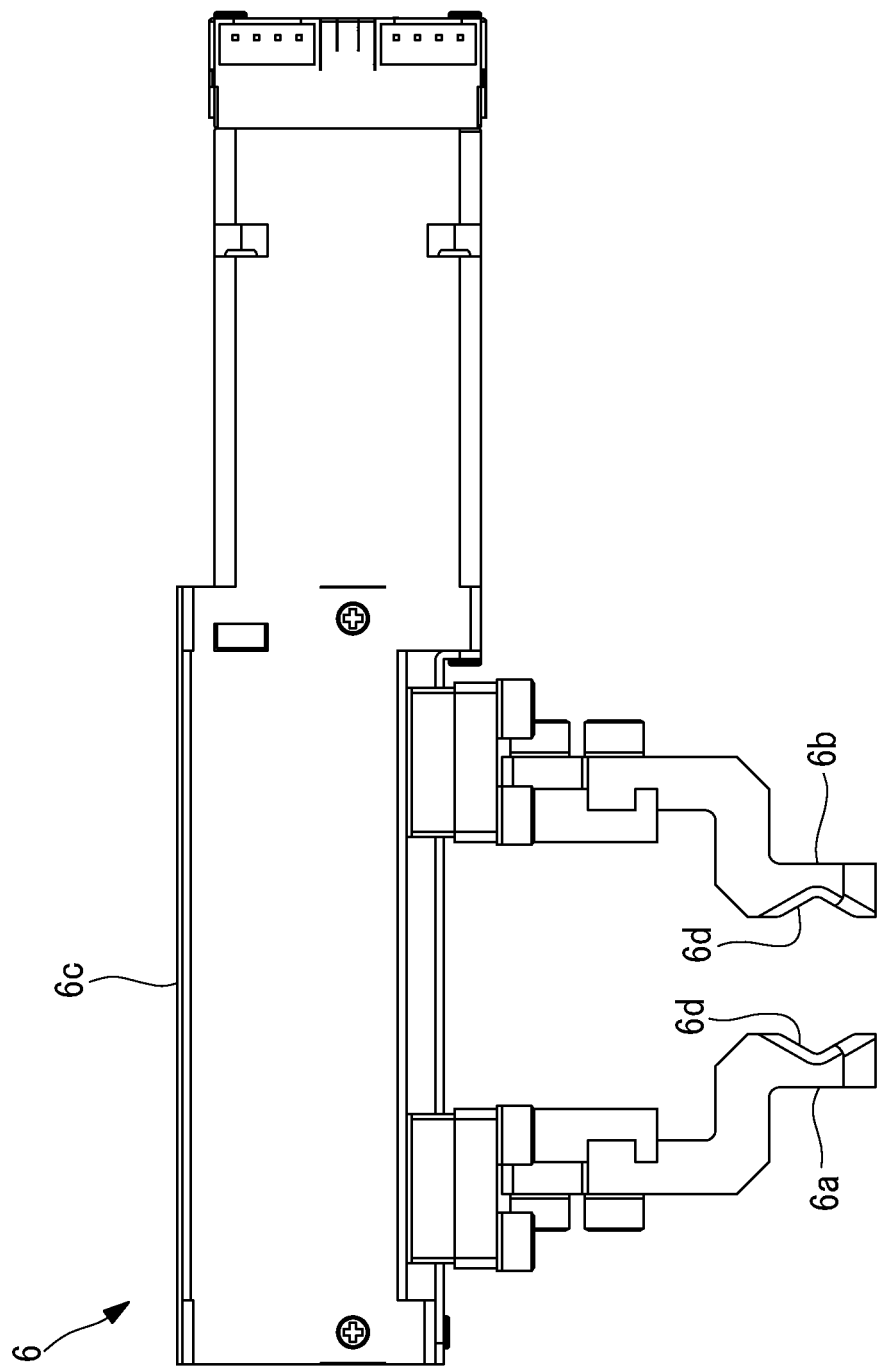
FIG. 5 is a front view of the fixed chuck unit.

The fixed chuck unit 6 includes: a pair of claws 6a and 6b that face each other; and an electric cylinder 6c that opens and closes the pair of claws 6a and 6b. The pair of claws 6a and 6b face each other in a direction orthogonal to the direction in which the pair of chuck portions 6 and 7 are arranged. As shown in FIG. 5, on inner surfaces of each of the claws 6a and 6b, a groove 6d that extends along the direction in which the pair of chuck portions 6 and 7 are arranged and in which a part of the harness main body 21 fits in a radial direction. By the electric cylinder 6c moving the pair of claws 6a and 6b in a closing direction in which the claws move closer to each other, the fixed chuck unit 6 holds the harness main body 21 between the pair of claws 6a and 6b in a state in which the harness main body 21 is contained within the groove 6d. On the other hand, by the electric cylinder 6c moving the pair of claws 6a and 6b in an opening direction in which the claws move away from each other, the fixed chuck unit 6 releases the harness main body 21.

Figure 6:
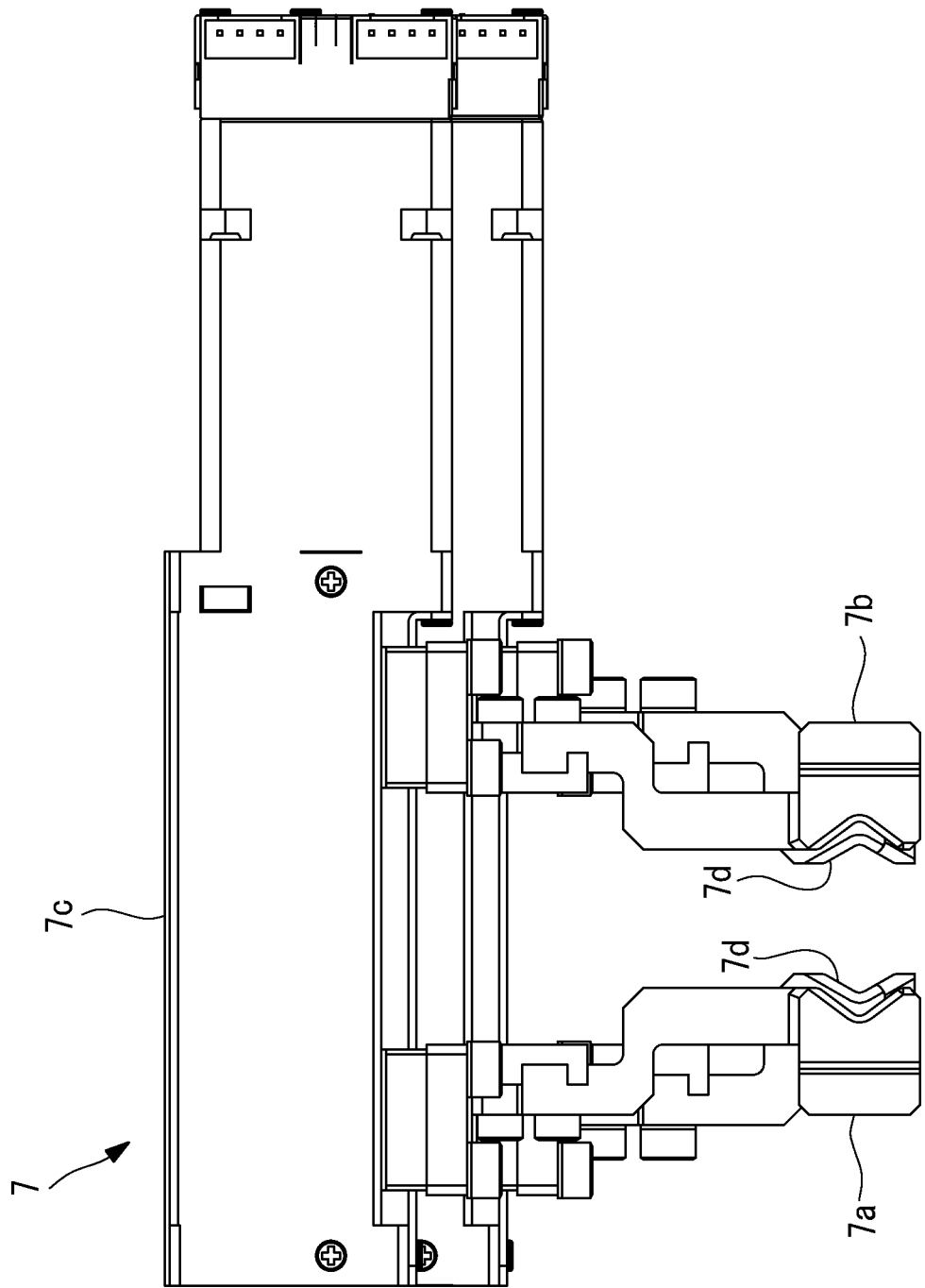
FIG. 6 is a front view of the movable chuck unit.

The movable chuck unit 7 includes: a pair of claws 7a and 7b that face each other; and an electric cylinder 7c that opens and closes the pair of claws 7a and 7b. The pair of claws 7a and 7b face each other in a direction orthogonal to the direction in which the pair of chuck portions 6 and 7 are arranged. As shown in FIG. 6, on inner surfaces of each of the claws 7a and 7b, a groove 7d that extends along the direction in which the pair of chuck portions 6 and 7 are arranged and in which a part of the harness main body 21 fits in a radial direction. By the electric cylinder 7c moving the pair of claws 7a and 7b in a closing direction in which the claws move closer to each other, the movable chuck unit 7 holds the harness main body 21 between the pair of claws 7a and 7b in a state in which the harness main body 21 is contained within the groove 7d. On the other hand, by the electric cylinder 7c moving the pair of claws 7a and 7b in an opening direction in which the claws move away from each other, the movable chuck unit 7 releases the harness main body 21.

By the robot controller 40 controlling positions of the claws 6a and 6b, and 7a and 7b using the electric cylinders 6c and 7c, it is possible to adjust a holding force of the harness main body 21 by each of the chuck portions 6 and 7. The fixed chuck unit 6 holds the harness main body 21 in a fixed state in which movement in the longitudinal direction is prevented. The movable chuck unit 7 alternatively holds the harness main body 21 in the fixed state in which movement in the longitudinal direction is prevented and in a held state in which movement in the longitudinal direction is allowed.

The linear driving device 8 is connected to the movable chuck unit 7 via a movable plate 11. The linear driving device 8 is an electric cylinder, for example, and is able to control an amount of movement and stopping position of the movable chuck unit 7. The linear driving device 8 linearly moves the movable chuck unit 7 along the direction in which the pair of chuck portions 6 and 7 are arranged in directions in which the movable chuck unit 7 moves closer to the fixed chuck unit 6 and away from the fixed chuck unit 6.

The camera 9 is a two-dimensional camera, for example. The camera 9 is fixed to the base section 2 (the lower plate 2b in the illustrated example), and positioned above the movable chuck unit 7. The camera 9 faces downward, and has a visual field including the movable chuck unit 7 and its surroundings. An image taken by the camera 9 is transmitted to the robot controller 40.

Each of the linear driving devices 4 is fixed to the base section 2, and supports the pair of chuck portions 6 and 7 and the linear driving device 8 via the fix plate 10. Each of the linear driving devices 4 linearly moves the pair of chuck portions 6 and 7 and the linear driving device 8 in an integrated manner. The linear driving devices 4 is an air cylinder or an electric cylinder, for example.

The camera 5 is a two-dimensional camera, for example. The camera 5 is fixed to the base section 2 (the upper plate 2a in the illustrated example), and faces downward. A focal length of the camera 5 is longer than a focal length of the camera 9, and the camera 5 has a wide visual field including the entire wire harness 20 positioned under the robot hand 1. An image taken by the camera 5 is transmitted to the robot controller 40.

The robot controller 40 includes a control unit having a processor, and a memory unit having a RAM, ROM, a nonvolatile memory, or the like. The memory unit stores an operation program for causing the robot hand 1 and the robot 30 to perform a connecting operation of the wire harness 20. The control unit causes the robot hand 1 and the robot 30 to perform the connecting operation of the wire harness 20 by controlling the robot hand 1 and the robot 30 according to the operation program.

Next, the connecting operation of the wire harness 20 by the robot hand 1 and the robot 30 will be described.

Figure 7:
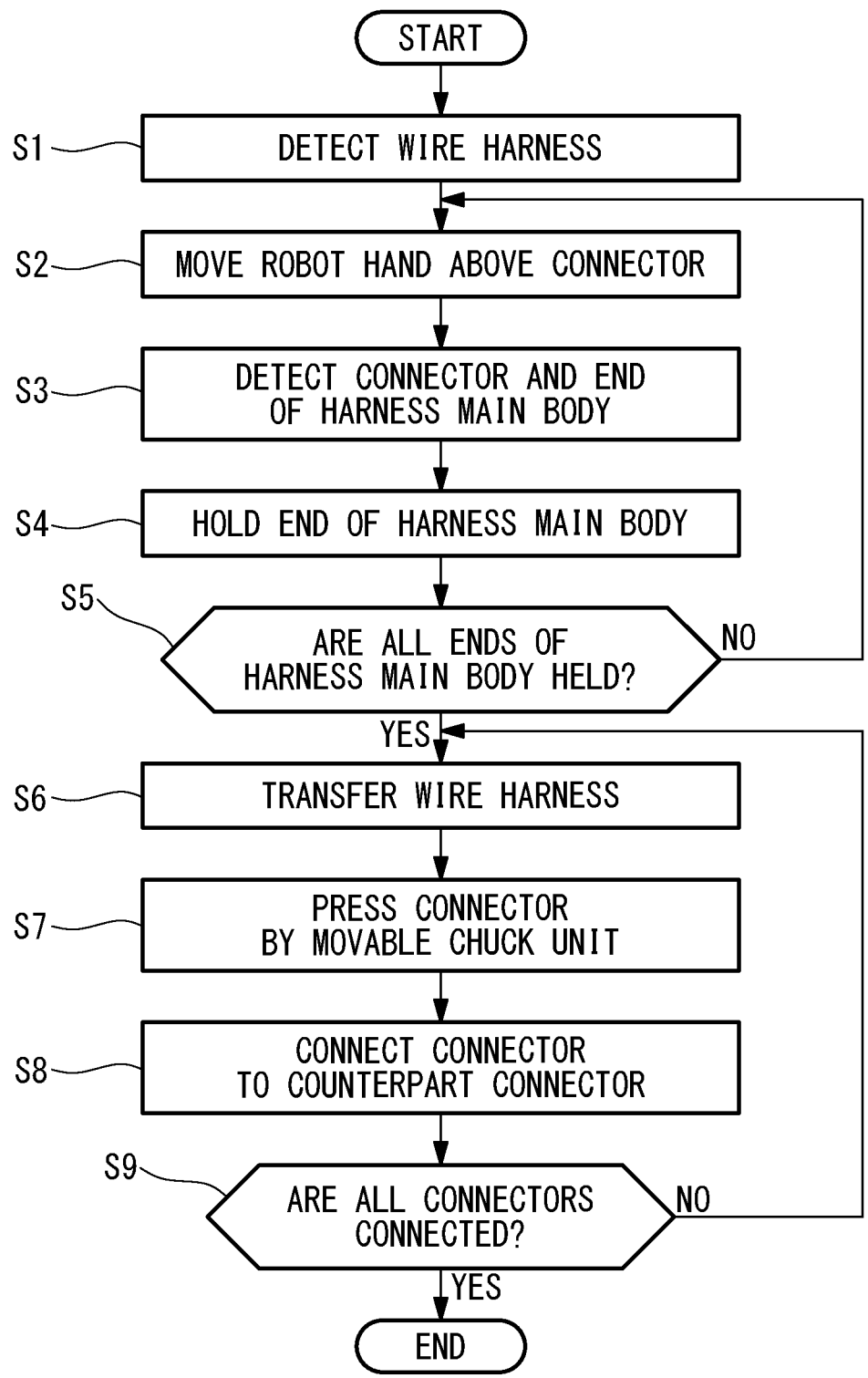
FIG. 7 is a flowchart showing a transfer operation of the wire harness and a connecting operation of the connector by the robot system shown in FIG. 1.

As shown in FIG. 7, the connecting operation of the wire harness 20 includes a transfer operation S1 to S6 for holding and transferring the wire harness 20 by the holding units 31 and 32, and a connector connecting operation S7 to S9 for connecting the connectors 22 to counterpart connectors (for example, connectors provided for other devices).

The wire harness 20 is supplied to a predetermined supply position by a supplying device that is not shown. First, the robot hand 1 is moved above the wire harness 20 at the supply position by an operation of the robot arm 30a.

Next, in Step S1, the camera 5 acquires an image of the wire harness 20 as a whole positioned under the robot hand 1, the robot controller 40 detects a position and posture of the wire harness 20 as a whole based on the image, and further detects positions and postures of the two connectors 22.

Next, in Step S2, the robot hand 1 is moved by the robot arm 30a moving based on the position and posture of one of the connectors 22 that has been detected, and the first holding unit 31 at the first end of the lower plate 2b is positioned above the one connector 22.

Figure 8:
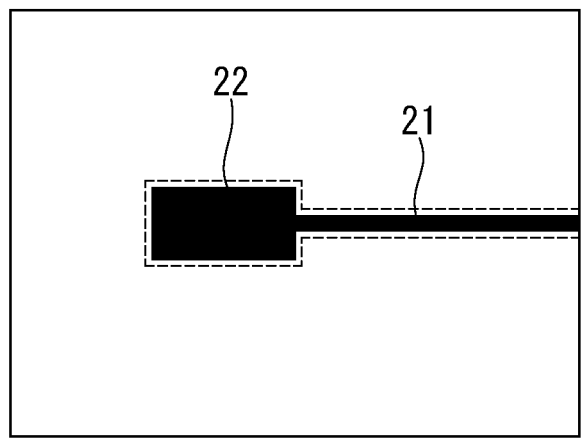
FIG. 8 is a diagram illustrating an image obtained by a camera of a holding unit.

Next, in Step S3, the camera 9 of the first holding unit 31 acquires an image including the one connector 22 positioned under the first holding unit 31 and one end of the harness main body 21 that is adjacent to the one connector 22, and as shown in FIG. 8, the robot controller 40 detects positions and postures of the connector 22 and the one end of the harness main body 21 based on the image.

Next, in Step S4, by the robot arm 30a and the linear driving devices 4 operating based on the detected positions and postures of the connector 22 and the one end of the harness main body 21, the pair of chuck portions 6 and 7 of the first holding unit 31 are placed at positions on the harness main body 21 spaced apart from the connector 22 by a predetermined distance in the longitudinal direction of the harness main body 21. At this time, the pair of chuck portions 6 and 7 are arranged in the longitudinal direction of the harness main body 21, and the movable chuck unit 7 is positioned between the fixed chuck unit 6 and the one connector 22. Next, as shown in FIG. 3, the fixed chuck unit 6 (first holding portion) and the movable chuck unit 7 hold the harness main body 21 respectively by the pairs of claws 6a and 6b, and 7a and 7b. With this, the harness main body 21 is held at the vicinity of its one end by the pair of chuck portions 6 and 7.

Then, Steps S2-S4 are repeated. Specifically, in a second round of Step S2, the robot hand 1 is moved by the robot arm 30a moving based on the position of the other of the connectors 22 that has been detected in Step S1, and the second holding units 32 at the second end of the lower plate 2b is positioned above the other connector 22.

Next, in a second round of Step S3, the camera 9 of the second holding unit 32 acquires an image including the other connector 22 positioned under the second holding unit 32 and the other end of the harness main body 21 that is adjacent to the other connector, and the robot controller 40 detects positions of the connector 22 and the other end of the harness main body 21 based on the image.

Next, in a second round of Step S4, by the robot arm 30a and the linear driving devices 4 operating based on the detected positions of the connector 22 and the other end of the harness main body 21, the pair of chuck portions 6 and 7 of the second holding unit 32 are positioned at positions on the harness main body 21 spaced apart from the connector 22 by a predetermined distance in the longitudinal direction of the harness main body 21. At this time, the pair of chuck portions 6 and 7 are arranged in the longitudinal direction of the harness main body 21, and the movable chuck unit 7 is positioned between the fixed chuck unit 6 and the other connector 22. Next, the fixed chuck unit 6 (second holding portion) and the movable chuck unit 7 hold the harness main body 21 respectively by the pairs of claws 6a and 6b, and 7a and 7b. With this, the harness main body 21 is held at the vicinity of the other end by the pair of chuck portions 6 and 7.

After the both ends of the harness main body 21 are held by the two holding units 31 and 32 (YES in Step S5), in Step S6, the robot hand 1 and the wire harness 20 are transferred, by an operation of the robot arm 30a, from the supply position to a connecting position at which counterpart connectors are disposed.

Next, in Step S7, by reducing a holding force, the movable chuck unit 7 of the first holding unit 31 holds the harness main body 21 in the held state in which movement in the longitudinal direction is allowed. Next, in a state in which the fixed chuck unit 6 holds the harness main body 21 in the fixed state, the linear driving device 8 moves the movable chuck unit 7 in a direction away from the fixed chuck unit 6. As shown in FIG. 4, the movable chuck unit 7 moves along the longitudinal direction of the harness main body 21 until it reaches a position at which the claws 7a and 7b press a side of the one connector 22 on a side of the harness main body 21 outwardly in the longitudinal direction of the harness main body 21. As shown in FIG. 3, when there is a gap between an end of the harness main body 21 and the connectors 22 and the wire 23 that is highly flexible is exposed, the position and posture of the connectors 22 easily change by flexure of the exposed wire 23. By pressing the one connector 22 outwardly by the movable chuck unit 7 in the longitudinal direction, a tensile force is applied between the position at which the wire harness 20 is held by the fixed chuck unit 6 and the connectors 22, and the position and posture of the one connector 22 become stable.

Next, in Step S8, the camera 9 of the first holding unit 31 acquires an image of the one connector 22, and the robot controller 40 detects the posture of the one connector 22. Next, by the robot arm 30a operating based on the detected posture of the connector 22, the one connector 22 held by the first holding unit 31 is connected to its counterpart connector.

Then, Steps S7 and S8 are repeated. Specifically, in a second round of Step S7, by reducing a holding force, the movable chuck unit 7 of the second holding unit 32 holds the harness main body 21 in the held state, the linear driving device 8 moves the movable chuck unit 7 in a direction away from the fixed chuck unit 6, and the claws 7a and 7b press a side of the other connector 22 on a side of the harness main body 21 outwardly in the longitudinal direction of the harness main body 21. With this, the position and posture of the other connector 22 become stable.

Next, in a second round of Step S8, the camera 9 of the second holding unit 32 acquires an image of the other connector 22, and the robot controller 40 detects the posture of the other connector 22. Next, by the robot arm 30a operating based on the detected posture of the connector 22, the other connector 22 held by the second holding unit 32 is connected to its counterpart connector.

After all of the connectors 22 of the wire harness 20 are connected to the respective counterpart connectors (YES in Step S9), the robot hand 1 returns to the supply position, and repeats Steps S1-S9.

As described above, according to this embodiment, the robot hand 1 is provided with at least two holding units 31 and 32 disposed at positions that are apart from each other in the longitudinal direction of the harness main body 21. Then, by holding the both ends of the wire harness 20 by the two holding units 31 and 32, it is possible to stably hold the wire harness 20 that is flexible and long. With this, transfer of the wire harness 20 from the supply position to the connecting position can be automated.

Further, the positions and postures the chuck portions 6 and 7 relative to the wire harness 20 at the supply position are controlled based on the detection result by the cameras 5 and 9. Therefore, even when the positions and postures the ends of the harness main body 21 and the connectors 22 are undetermined at the supply position, it is possible to appropriately hold the harness main body 21 by the chuck portions 6 and 7. With this, the robot hand 1 may have a configuration that is more suitable for automated transfer of the wire harness 20.

Moreover, each of the holding units 31, 32, and 33 is provided with the movable chuck unit 7 that presses the connectors 22 in a state in which the end of the harness main body 21 is fixed by the fixed chuck unit 6. By the movable chuck unit 7 pressing the connectors 22, the harness main body 21 and the wire 23 are maintained in a tensioned state between the held position of the harness main body 21 by the fixed chuck unit 6 and the connectors 22. With this, it is possible to stabilize the positions and postures of the connectors 22, and to automate connection of the connectors 22 to respective counterpart connectors.

Furthermore, each of the chuck portions 6 and 7 holds the harness main body 21 in place of the connectors 22. Therefore, regardless of shapes of the connectors 22, it is possible to hold and transfer the wire harness 20 by the robot hand 1 and connect the connectors 22 to respective counterpart connectors. In addition, it is possible to carry out connection to a counterpart connector by movement of the robot hand 1, even when the connector 22 is a type such that the entire connector 22 is inserted into the counterpart connector. As described above, it is possible for the same robot hand 1 to perform automated transfer and automated connection of the wire harness 20 having the connectors 22 of various types, and thus to provide the robot hand 1 that is highly versatile.

In this embodiment, transfer and connection of the wire harness 20 having the two connectors 22 has been described, but the robot hand 1 may also be applied to a Y-shaped wire harness 20 having three connectors 22. Specifically, the wire harness 20 may have a branched portion at a middle position in the longitudinal direction of the harness main body 21, and one end may have one connector 22 and the other end may have two connectors 22. In this case, holding and connecting of the third connector 22 is carried by the third holding units 33 at the third end of the lower plate 2b.

Further, the number of the holding units of the robot hand 1 may be changed as needed according to the number of the connectors 22 of the wire harness 20 to be held. For example, in a case of the wire harness 20 having the two connectors 22, two holding units are provided for two ends of an I-shaped lower plate. When applied to the wire harness 20 having four connectors 22, four holding units are provided for four ends of an X-shaped lower plate.

In this embodiment, the pressing portion pressing the connectors 22 is the movable chuck unit 7, but the pressing portion may be a different means. For example, the pressing portion may be provided for the fixed chuck unit 6 as a member that expands and contracts in the longitudinal direction of the harness main body 21 while supporting the harness main body 21.

In this embodiment, the entire-body detection unit is a camera that acquires an image of the wire harness 20, but the entire-body detection unit may be a sensor of a different type. Likewise, the partial detection unit may be a sensor of a different type, instead of a camera.

In this embodiment, the robot hand 1 that carries out both of the transfer of the wire harness 20 and the connection of the connectors 22 has been described. However, the robot hand may be designed to carry out only one of the transfer of the wire harness 20 and the connection of the connectors 22.

For example, a robot hand dedicated for transfer of the wire harness 20 may not include the movable chuck unit 7. A robot hand dedicated for connection of the connectors 22 may include only one holding unit.

From the above-described embodiments, the following aspects of the present disclosure are derived.

A first aspect of the present invention provides a robot hand that holds a wire harness, wherein the wire harness has a long harness main body and a connector connected to an end of the harness main body, the robot hand including: a fixed holding portion which holds the harness main body at a vicinity of the end thereof; a pressing portion movable relative to the fixed holding portion, in a longitudinal direction of the harness main body held by the fixed holding portion; and a driving unit which moves the pressing portion in a direction away from the fixed holding portion such that the pressing portion presses the connector outwardly in the longitudinal direction of the harness main body.

According to this aspect, by the pressing portion being moved by the driving unit toward the connector in a state in which the harness main body is held at the vicinity of its end using the fixed holding portion, the connector is pressed by pressing portion outwardly in the longitudinal direction. In the state in which the connector is pressed, a tensile force is applied on the end of the harness main body between the held position by the fixed holding portion and the connector, and therefore the position and posture of the connector become stable. Accordingly, the connector may be connected to a counterpart connector by moving the robot hand in the state in which the connector is pressed by pressing portion.

As described above, as the robot hand holds the harness main body instead of the connector, it is possible to carry out a connecting operation for connectors of various types using the same robot hand. In other words, it is possible to provide a versatile robot hand suitable for automating a connecting operation of the wire harness.

In the above aspect, the pressing portion may be a movable holding portion arranged with the fixed holding portion in the longitudinal direction of the harness main body held by the fixed holding portion, the movable holding portion is configured to hold the harness main body, and the movable holding portion may be able to hold the harness main body in one of a fixed state and a held state, wherein the fixed state is a state in which the harness main body is held in a manner unmovable in the longitudinal direction, and the held state is a state in which the harness main body is held in a manner movable in the longitudinal direction.

According to this configuration, it is possible to hold the wire harness more stably as two ends of the harness main body that are spaced apart in the longitudinal direction are held by the fixed holding portion and the movable holding portion.

In the above aspect, two sets each including the fixed holding portion, the pressing portion, and the driving unit may be provided, wherein the fixed holding portion of one of the two sets may hold the harness main body at a vicinity of one end of the harness main body, and the fixed holding portion of the other of the two sets may hold the harness main body at a vicinity of the other end of the harness main body.

According to this configuration, it is possible to hold the wire harness more stably by holding the harness main body at the vicinity of the both ends using two fixed holding portions. Further, it is possible to transfer the wire harness by moving the robot hand. Moreover, it is possible to stabilize the positions and postures of the two connectors connected to the both ends of the harness main body by the pressing portions and the driving units of the two sets, and to connect the two connectors to the respective counterpart connectors.

A second aspect of the present invention provides a robot hand that holds a wire harness, wherein the wire harness has a long harness main body and two connectors respectively connected to one end and the other end of the harness main body, the robot hand including: a first holding portion which holds the harness main body at a vicinity of the one end; and a second holding portion which holds the harness main body at a vicinity of the other end.

According to this aspect, it is possible to hold the wire harness more stably by holding the harness main body at the vicinity of the both ends using the first holding portion and the second holding portion. Further, it is possible to transfer the wire harness by moving the robot hand.

As described above, as the robot hand holds the harness main body instead of the connector, a transfer operation of connectors of various types may be carried out by the same robot hand. In other words, it is possible to provide a versatile robot hand suitable for automating a connecting operation of the wire harness.

In the above aspects, it is preferable to provide an entire-body detection unit which detects a position and posture of an entire body of the wire harness.

According to this configuration, the detection result by the entire-body detection unit may be used in order to roughly determine the position and posture of the robot hand relative to the connector.

In the above aspects, it is preferable to provide a partial detection unit which detects a position and posture of the end of the wire harness including the connector.

According to this configuration, the detection result by the partial detection unit may be used in order to accurately determine the position and posture of the fixed holding portion, the first holding portion, or the second holding portion relative to the connector.

A third aspect of the present invention provides a robot system including: a robot; the robot hand according to the first aspect, the robot hand being connected to a distal end of a robot arm of the robot; and a robot controller configured to control the robot and the robot hand to cause the robot and the robot hand to carry out a connector connecting operation for connecting the connector to a counterpart connector, wherein the connector connecting operation includes: holding the harness main body at a vicinity of an end using the fixed holding portion; pressing the connector using the pressing portion by an operation of the driving unit; and connecting the connector that is being pressed to the counterpart connector by an operation of the robot arm.

In the third aspect, the robot hand may include a partial detection unit which detects a position and posture of the end of the wire harness including the connector, and the robot controller may be configured to: control a position and posture of the fixed holding portion relative to the harness main body when holding the harness main body, based on the position and posture of the end of the wire harness detected by the partial detection unit; and control a position and posture of the robot hand relative to the counterpart connector when connecting the connector, based on the position and posture of the connector detected by the partial detection unit.

A fourth aspect of the present invention provides a robot system including: a robot; the robot hand according to the second aspect, the robot hand being connected to a distal end of a robot arm of the robot; and a robot controller which controls the robot and the robot hand to cause the robot and the robot hand to carry out a transfer operation for transferring the wire harness, wherein the transfer operation includes: holding the harness main body at a vicinity of the one end thereof using the first holding portion; holding the harness main body at a vicinity of the other end thereof using the second holding portion; and transferring the wire harness held by the first holding portion and the second holding portion by an operation of the robot arm.

In the fourth aspect, the robot hand may include an entire-body detection unit which detects a position and posture of an entire body of the wire harness, and holding the harness main body, the robot controller may control a position and posture of the robot hand relative to the harness main body when holding the harness main body, based on the position and posture of the entire body of the wire harness detected by the entire-body detection unit.

According to the aforementioned aspects, an advantageous effect is afforded in that it is possible to provide a versatile robot hand adapted for automatization of a connecting operation of a wire harness.

REFERENCE SIGNS LIST

1 Robot hand
2 Base section 3, 31 and 32, 33 holding unit
4 Linear driving device
5 Camera (entire-body detection unit)
6 Fixed chuck unit (fixed holding portion)
7 Movable chuck unit (pressing portion, movable holding portion)
8 Linear driving device (driving unit)
9 Camera (partial detection unit)
20 Wire harness
21 Harness main body
22 Connector
30 Robot
30a Robot arm
40 Robot controller
100 Robot system

The invention claimed is:

1. A robot hand that holds a wire harness, wherein the wire harness has a long harness main body and a connector connected to an end of the harness main body,
the robot hand comprising:
a fixed holding portion which holds the harness main body at a vicinity of the end thereof;
a movable holding portion that is movable relative to the fixed holding portion in a longitudinal direction of the harness main body held by the fixed holding portion and that is capable of holding the harness main body between the fixed holding portion and the connector connected to the end; and
a driving unit configured to move the movable holding portion in a direction away from the fixed holding portion such that the movable holding portion presses the connector outwardly in the longitudinal direction of the harness main body.

2. The robot hand according to claim 1, wherein
the movable holding portion is arranged with the fixed holding portion in the longitudinal direction of the harness main body held by the fixed holding portion, and
the movable holding portion is capable of holding the harness main body so that the harness main body is movable in the longitudinal direction relative to the movable holding portion when the driving unit moves the movable holding portion in the direction away from the fixed holding portion.

3. The robot hand according to claim 1, wherein the robot hand comprises two sets each including the fixed holding portion, the movable holding portion, and the driving unit, wherein
the fixed holding portion of one of the two sets holds the harness main body at a vicinity of one end of the harness main body, and the fixed holding portion of the other of the two sets holds the harness main body at a vicinity of the other end of the harness main body.

4. A robot hand that holds a wire harness, wherein the wire harness has a long harness main body, a first connector connected to one end of the harness main body, and a second connector connected to the other end of the harness main body, the robot hand comprising:
a first holding portion which holds the harness main body at a portion of the one end; and
a second holding portion which holds the harness main body at a portion of the other end,
wherein the first holding portion comprises:
a fixed holding portion capable of holding the portion of the one end of the harness main body;
a movable holding portion that is movable relative to the fixed holding portion in a longitudinal direction of the harness main body held by the fixed holding portion and that is capable of holding the harness main body between the fixed holding portion and the first connector; and
a driving unit configured to move the movable holding portion in a direction away from the fixed holding portion such that the movable holding portion presses the first connector outwardly in the longitudinal direction of the harness main body.

5. The robot hand according to claim 1, comprising:
an entire-body detection unit which detects a position and posture of an entire body of the wire harness.

6. The robot hand according to claim 1, comprising:
a partial detection unit which detects a position and posture of the end of the wire harness including the first connector.

7. A robot system comprising:
a robot;
the robot hand according to claim 1, the robot hand being connected to a distal end of a robot arm of the robot; and
a robot controller configured to control the robot and the robot hand to cause the robot and the robot hand to carry out a connector connecting operation for connecting the connector to a counterpart connector, wherein the connector connecting operation includes:
holding the harness main body at a vicinity of an end thereof using the fixed holding portion; and
pressing the connector using the movable holding portion by an operation of the driving unit; and connecting the connector that is being pressed toward the counterpart connector by an operation of the robot arm.

8. The robot system according to claim 7, wherein
the robot hand includes a partial detection unit which detects a position and posture of the end of the wire harness including the connector, and
the robot controller is configured to:
control a position and posture of the fixed holding portion relative to the harness main body when holding the harness main body, based on the position and posture of the end of the wire harness detected by the partial detection unit; and
control a position and posture of the robot hand relative to the counterpart connector when connecting the connector, based on the position and posture of the connector detected by the partial detection unit.

9. A robot system comprising:
a robot;
the robot hand according to claim 4, the robot hand being connected to a distal end of a robot arm of the robot; and
a robot controller configured to control the robot and the robot hand to cause the robot and the robot hand to carry out a transfer operation for transferring the wire harness, wherein
the transfer operation includes:
holding the harness main body at the portion of the one end thereof using the first holding portion; and
holding the harness main body at the portion of the other end thereof using the second holding portion; and transferring the wire harness held by the first holding portion and the second holding portion by an operation of the robot arm.

10. The robot system according to claim 9, wherein the robot hand includes an entire-body detection unit which detects a position and posture of an entire body of the wire harness, and the robot controller controls a position and posture of the robot hand relative to the harness main body when holding the harness main body, based on the position and posture of the entire body of the wire harness detected by the entire-body detection unit.

11. The robot hand according to claim 4, wherein:

the movable holding portion is arranged with the fixed holding portion in the longitudinal direction of the harness main body held by the fixed holding portion; and the movable holding portion is capable of holding the harness main body so that the harness main body is movable in the longitudinal direction relative to the movable holding portion when the driving unit moves the movable holding portion in the direction away from the fixed holding portion.

12. A robot hand that holds a wire harness, wherein the wire harness has a long harness main body and two connectors respectively connected to one end and the other end of the harness main body, the robot hand comprising:

a first holding portion which holds the harness main body at a vicinity of the one end, wherein the first holding portion comprises a first fixed-holding portion and a first pressing portion movable relative to the first fixed-holding portion in a longitudinal direction of the harness main body, wherein the first portion is positioned between the first fixed-holding portion and a first connector of the two connectors; and a second holding portion which holds the harness main body at a vicinity of the other end, wherein the second holding portion comprises a second fixed-holding portion and a second portion movable relative to the second fixed-holding portion in a longitudinal direction of the harness main body, wherein the second portion is positioned between the second fixed-holding portion and a second connector of the two connectors.

* * * * *